US012624147B2

(12) United States Patent
Diena et al.

(10) Patent No.: US 12,624,147 B2
(45) Date of Patent: May 12, 2026

(54) DIMENSIONALLY STABLE POLYURETHANES AND COMPOSITES

(71) Applicant: Dow Global Technologies LLC, Midland, MI (US)

(72) Inventors: Paolo Diena, Modena (IT); Thomas Mosciatti, Modena (IT); Andrea Benvenuti, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 557 days.

(21) Appl. No.: 18/021,584

(22) PCT Filed: Aug. 23, 2021

(86) PCT No.: PCT/US2021/047051
§ 371 (c)(1),
(2) Date: Feb. 16, 2023

(87) PCT Pub. No.: WO2022/046581
PCT Pub. Date: Mar. 3, 2022

(65) Prior Publication Data
US 2023/0303754 A1 Sep. 28, 2023

(30) Foreign Application Priority Data
Aug. 31, 2020 (IT) ........................ 102020000020665

(51) Int. Cl.
| | |
|---|---|
| *C08G 18/12* | (2006.01) |
| *B29C 67/24* | (2006.01) |
| *C08G 18/09* | (2006.01) |
| *C08G 18/32* | (2006.01) |
| *C08G 18/48* | (2006.01) |
| *C08G 18/50* | (2006.01) |
| *C08G 18/66* | (2006.01) |
| *C08G 18/76* | (2006.01) |
| *C08K 3/26* | (2006.01) |
| *C08K 7/14* | (2006.01) |
| *C08L 75/08* | (2006.01) |

(52) U.S. Cl.
CPC ............ *C08G 18/12* (2013.01); *B29C 67/246* (2013.01); *C08G 18/092* (2013.01); *C08G 18/3281* (2013.01); *C08G 18/4812* (2013.01); *C08G 18/4816* (2013.01); *C08G 18/482* (2013.01); *C08G 18/4829* (2013.01); *C08G 18/5021* (2013.01); *C08G 18/5033* (2013.01); *C08G 18/6688* (2013.01); *C08K 3/26* (2013.01); *C08K 7/14* (2013.01); *C08L 75/08* (2013.01); *C08G 18/7664* (2013.01); *C08G 2110/0025* (2021.01); *C08G 2110/0033* (2021.01); *C08G 2110/005* (2021.01); *C08K 2003/265* (2013.01); *C08K 2201/003* (2013.01); *C08K 2201/004* (2013.01)

(58) Field of Classification Search
None
See application file for complete search history.

(56) References Cited

U.S. PATENT DOCUMENTS

| | | | |
|---|---|---|---|
| 3,245,924 A | 4/1966 | Cox | |
| 4,405,752 A | 9/1983 | Recker | |
| 4,588,803 A | 5/1986 | Christman | |
| 4,780,482 A | 10/1988 | Krueger | |
| 2018/0319942 A1* | 11/2018 | Kumar | ............... C08G 18/6622 |

FOREIGN PATENT DOCUMENTS

| | | |
|---|---|---|
| CN | 106046296 A | 10/2016 |
| CN | 107266649 A | 10/2017 |
| CN | 108660867 A | 10/2018 |

OTHER PUBLICATIONS

PMA Urethane Calculations found on website https://pma.memberclicks.net/common-urethane-calculations (Year: none).*

* cited by examiner

*Primary Examiner* — Marc S Zimmer
*Assistant Examiner* — Virginia L Stonehocker
(74) *Attorney, Agent, or Firm* — Arthur R. Rogers

(57) ABSTRACT

Rigid polyurethanes and composites are made from a reaction mixture containing an aromatic polyisocyanate and a mixture of polyols. The mixture of polyols has an average hydroxyl equivalent weight of 125 to 275 and an average hydroxyl funtionality of 2.5 to 4 hydroxyl groups per molecule. 5 to 33% of the weight of the mixture of polyols is triisopropanolamine. Rigid polyurethanes made from such a reaction mixture have excellent dimensional stability, even when cured at or near room temperature.

12 Claims, No Drawings

DIMENSIONALLY STABLE POLYURETHANES AND COMPOSITES

This invention relates to polyurethanes and polyurethane composites, and method for making them.

Rigid polyurethanes and composites made with rigid polyurethanes are useful as load-bearing members in many types of construction. They have the advantages of having great strength and low weight compared to construction metals like steel. As such, they have found uses as deck planking, automotive and other vehicular structural beams, I-beams and other beams for building construction, manhole covers and road decking, among others.

The rigid polyurethanes are made by curing precursor materials that include one or more polyisocyanates and one or more polyols. Curing can take place at about room temperature or at some elevated temperature. Curing at a somewhat elevated temperature such as 50 to 80° C. offers some advantages, as curing times in the mold are shorter and a more complete cure can be obtained. Unfortunately, elevated temperature curing adds to manufacturing costs, because of increased energy and equipment expenses. These additional costs can become quite substantial, particularly when manufacturing very large parts.

Some manufacturers prefer to avoid these extra costs by using a room temperature cure. However, parts made using a room temperature cure often exhibit inadequate dimensional stability. They tend to exhibit an unwanted amount of thermal expansion and contraction. When used in hot environments or in settings in which there is no temperature control and temperatures can vary considerably with the time or day or the season of the year, the parts can exhibit a significant amount of expansion or shrinkage.

It would be desirable to provide a rigid polyurethane or polyurethane composite that exhibits greater dimensional stability, particularly when produced without using an elevated temperature cure.

This invention is in a first aspect composite comprising a continuous resin phase and 8 to 85% by weight, based on the weight of athe composite, of a discontinuous phase comprising filler particles, reinforcing fibers or both filler particles and reinforcing fibers, wherein the continuous resin phase is a cured polyurethane which is the reaction product of a polyurethane-forming reaction mixture characterized by an isocyanate index of 95 to 150, the reaction mixture comprising A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 275 and an average hydroxyl functionality of 2.5 to 4 hydroxyl groups per molecule, wherein triisopropanolamine constitutes 5 to 33 weight percent of the mixture of polyols.

The invention is also a process for preparing the foregoing composite, comprising (i) introducing reinforcing fibers and/or filler particles and a polyurethane-forming reaction mixture into a cavity of a mold or onto a form, closing the mold or applying mechanical pressure to the form such that the reinforcing fibers and/or filler particles become embedded in the polyurethane-forming reaction mixture and (ii) curing the polyurethane-forming reaction mixture in the presence of the reinforcing fibers and/or filler particles in the mold cavity or on the form to form the composite, wherein the polyurethane-forming reaction mixture is characterized by an isocyanate index of 95 to 150 and comprises A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 275 and an average hydroxyl functionality of 2.5 to 4 hydroxyl groups per molecule, wherein triisopropanolamine constitutes 5 to 33 weight percent of the mixture of polyols.

The polyurethane and composite of the invention have remarkably good dimensional stability as determined by the method described herein, even when cured at room temperature or only slightly above room temperature. The mixture of polyols and aromatic polyisocyanate exhibit a curing profile that is well-suited for making large moldings. The mixture of polyols and aromatic polyisocyanate perform well when used to make fiber-reinforced composites in a casting process such as an LFI (long fiber injection) process, as well as other processes such as S-RIM, resin transfer molding and others.

The polyurethane-forming reaction mixture contains a mixture of polyols, one of which is triisopropanolamine (TIPA). The amount of TIPA is based on the weight of the polyols only, not on the weight of other ingredients as may be present in the polyurethane-forming reaction mixture. TIPA constitutes 5 to 33 weight percent of the mixture of polyols Within this broad range, increasing the amount of TIPA from 5 wt.-% up to about 20 to 25 wt.-% tends to improve dimensional stability, so a preferred lower amount is at least 10 wt.-%, at least 12 wt.-% or at least 15 wt.-%.

TIPA may be provided in the form of a neat or substantially neat material containing 95 to 100% TIPA by weight. A commercial grade containing 98 to 99.5% TIPA is suitable. Such highly concentrated grades of TIPA are room temperature solids, and may be melted if desired to be combined with the other components of the polyol blend. If desired, a mixture or solution of TIPA in a suitable solvent may be used. Such a mixture or solution may, for example, contain 80 to 97 wt.-% TIPA and correspondingly 3 to 20 wt.-% of another material, such as water, a polyol different than TIPA, or a solvent that is not isocyanate reactive. If TIPA is provided as a mixture with water, it is preferred to keep the total amount of water in the polyurethane-forming reaction mixture, including that provided with the TIPA, to within the amounts mentioned below. Any polyol present in such a mixture or solution is counted toward the weight of the mixture of polyols but not the weight of the TIPA. TIPA itself has a molecular weight of about 191.3 and a hydroxyl functionality of 3.

It is most preferred that triethanolamine (TEOA) is absent or constitutes at most 2 wt.-%, at most 0.5 wt.-% or at most 0.1 wt.-% of the mixture of polyols.

The mixture of polyols includes at least one additional polyol, different than TIPA and TEOA, such that the mixture of polyols has an average hydroxyl equivalent weight of 125 to 275 and an average hydroxyl functionality of 2.5 to 4 hydroxyl groups per molecule. The average hydroxyl equivalent weight may be at least 140 (hydroxyl number 400.7 mg KOH/g), at least 150 (hydroxyl number 374), at least 160 (hydroxyl number 350.6) and may be, for example, up to 250 (hydroxyl number 224.4), up to 225 (hydroxyl number 249.3), up to 210 (hydroxyl number 267.1) or up to 200 (hydroxyl number 280.5). The hydroxyl equivalent weight of the mixture of polyols can be determined by measuring the hydroxyl number of the blend using well-known titration methods, or can be calculated from the equivalent weights and/or hydroxyl numbers of the individual polyols.

The mixture of polyols preferably contains no more than 5 wt.-%, preferably no more than 2 wt.-% of an amine-containing polyol other than TIPA and/or TEOA. The mixture of polyols may contain no more than 1 wt.-%, no more than 0.5 wt.-% or no more than 0.25 wt.-% of another amine-containing polyol, and may contain no other amine-containing polyol.

The additional polyol or polyols in the mixture of polyols may have hydroxyl equivalent weights of 31 to 3000 or more, and hydroxyl functionalities of 2 to 8 or more, preferably 2 to 6, provided the mixture of polyols has average hydroxyl equivalent weight and functionality as described before. It is preferred that no more than 25 wt.-% of the mixture of polyols is one or more polyols having a functionality of 5 or higher. The mixture of polyols may contain at most 10 wt.-%, at most 5 wt.-% or at most 2 wt.-% of polyols having a functionality of 5 or greater, and may contain no such polyols.

The mixture of polyols preferably contains no more than 10 wt.-% of polyols having a hydroxyl equivalent weight of less than 70, other than TIPA. It may contain no more than 5 wt.-%, no more than 2 wt.-% or no more than 1 wt.-% of polyols having a hydroxyl equivalent weight of less than 70 other than TIPA.

The additional polyol in some embodiments includes at least one polyol having 2 to 4, preferably 3 to 4, hydroxyl groups and a hydroxyl equivalent weight of 150 to 300, preferably 175 to 275 or 175 to 225, and which does not contain nitrogen atoms. Such a polyol or polyols may constitute at least 50 wt.-%, at least 60 wt.-% or at least 70 wt.-% of the mixture of polyols and up to 95 wt.-% or up to 90 wt.-% thereof. This particular additional polyol is preferably a polyether polyol made by alkoxylating a starter having 2 to 4, preferably 3 to 4, hydroxyl groups. The starter preferably is alkoxylated with 1,2-propylene oxide, ethylene oxide or both 1,2-propylene oxide and ethylene oxide, although other polymerizable oxiranes can be used. In some embodiments, the mixture of polyols contains only the TIPA and at least one polyol having 2 to 4, preferably 3 to 4, hydroxyl groups and a hydroxyl equivalent weight of 150 to 300, preferably 175 to 275 or 175 to 225, and which does not contain nitrogen atoms.

The aromatic polyisocyanate compounds used to make the polyurethane polymer matrix are compounds that contain two or more aromatically-bound isocyanate groups per molecule. A preferred isocyanate is methane diphenyldiisocyanate (MDI) and a still more preferred isocyanate compound is a polymeric MDI. By "polymeric MDI", it is meant a mixture of MDI with polymethylene polyphenylisocyanates that contain at least three phenylisocyanate groups. The MDI may be either the 2,4'- or the 4,4'-isomer, or a mixture of both. The MDI or polymeric MDI may be modified with carbodiimide, uretonimine, urethane, urea or biuret linkages.

The aromatic polyisocyanate compounds preferably have an isocyanate equivalent weight of 125 to 168 and an average isocyanate functionality of 2.2 to 4.0. An example of a useful polyisocyanate is a polymeric MDI having an isocyanate equivalent weight of about 130 to 168, especially 130 to 150, and an isocyanate functionality of 2.2 to about 3.5, especially 2.5 to 2.75.

The polyisocyanate is provided to the polyurethane-forming reaction mixture to provide an isocyanate index of 95 to 150. In some embodiments the isocyanate index is at least 100 or at least 102 and up to 125, up to 115 or up to 110. Isocyanate index is 100 times the ratio of equivalents of isocyanate groups to equivalents of isocyanate-reactive groups provided to the polyurethane-forming reaction mixture.

The polyurethane-forming reaction mixture preferably includes at least one urethane catalyst, i.e., a catalyst for the reaction of an isocyanate group with a hydroxyl group. Examples of urethane catalysts include, for example, tertiary amine compounds, cyclic amidines and various metal carboxylate compounds, especially tin carboxylates and tetravalent tin compounds. Amine catalysts preferably have zero or at most one hydroxyl group.

The choice of catalyst and amount of catalyst may be selected to provide the polyurethane-forming reaction mixture with desired curing characteristics. For producing large parts in a casting or spraying method, the polyurethane-forming reaction mixture may exhibit, for example, a cream time of at least 20 seconds, preferably 20 to 40 seconds; a gel time of least 90 seconds and preferably 100 to 150 seconds; and a tack-free time of at least 120 seconds, preferably at least 140 seconds and preferably up to 200 seconds; all measured in the manner described in the following examples. In such embodiments, the selection of type and amount of catalysts is selected to obtain such values.

Representative amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N,N',N'',N''-pentamethyldiethylenetriamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, N,N-dimethylcyclohexylamine, N-cetyl N,N-dimethyl amine, N-coco-morpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, 1,8-diazabicyclo-5,4,0-undecene-7, 2,4,6-tris(dimethylaminomethyl)phenol, N,N-dimorpholinodiethyl ether, N-methyl imidazole, dimethyl aminopropyl dipropanolamine, bis(dimethylaminopropyl) amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin catalysts include stannous octoate, dibutyltin diacetate, dimethyltin diacetate, dimethyltin dilaurate, dibutyl tin dilaurate, dibutyltin dimercaptide, dialkyltin dialkylmercapto acids, dibutyl tin oxide, dimethyl tin dimercaptide, dimethyl tin diisooctylmercaptoacetate, dibutyltin diisooctylmercaptoacetate, tin octoate, dibutyltin dioctoate, dimethyltindioctoate, and the like.

Catalysts are typically used in small amounts. For example, the total amount of catalyst used may be 0.0015 to 5, preferably 0.01 to 2, parts by weight per 100 parts by weight of the mixture of polyols. Metallic catalysts are generally used in amounts of less than 0.5 parts by weight of the mixture of polyols.

The polyurethane-forming reaction mixture may contain a blowing agent. Water is a preferred blowing agent, although other chemical (exothermic) and physical (endothermic) blowing agents may be used instead of or in addition to water. Among the useful physical blowing agents are compounds having boiling temperatures from 10 to 50° C., including hydrocarbons, hydrofluorocarbons, hydrofluorochlorcarbons, hydrofluorinated olefins and hydrofluorochloroolefins as described, for example, in US 2007/0100010 and other low boiling compounds such as diethyl ether. Those having low or zero global warming potential and low or zero ozone depletion potential are preferred. Water as a sole blowing agent may be used in an amount of 0.25 to 1.5 parts by weight per 100 parts by weight of the mixture of polyols.

Blowing agents, when used, preferably are used in amounts such that the composite has a void volume of no greater than 75 volume percent, preferably no higher than 65 volume percent. Higher void volumes tend to cause the composite to lack physical properties needed for structural applications. The void volume may be any lower amount, including zero. For structural applications, a void volume of 25 to 65 volume-% often provides a good balance between product weight and structural strength, although the void volume may be as low as 0%. Void volume can be determined by microscopic instruction, or calculated by comparing the density of the composite with the expected density of a fully compact composite made from the same materials except for the blowing agent.

The density of the composite is in some embodiments at least 250 kg/m$^3$ or at least 350 kg/m$^3$. In particular embodiments, the density of the composite may be up to 1500 kg/m$^3$, up to 1250 kg/m$^3$, up to 1000 kg/m$^3$, up to 800 kg/m$^3$ or up to 700 kg/m$^3$.

A foam-stabilizing surfactant may be present in the polyurethane-forming reaction mixture. A wide variety of silicone surfactants as are commonly used in making polyurethane foams can be used. Examples of such silicone surfactants are commercially available under the tradenames Tegostab™ (Evonik Niax™ (Momentive Performance Materials) and Dabco™ (Evonik) Various other, non-silicone anionic, cationic, zwitterionic and non-ionic surfactants are also useful. Examples of useful non-ionic surfactants include block copolymers of ethylene oxide and a higher alkylene oxide such as 1,2-propylene oxide and 1,2-butylene oxide. Such block copolymers may contain, for example, 40 to 90% by weight oxyethylene units and have molecular weights of 1500 to 12,000. Such block copolymers may have one or more hydroxyl groups. Examples of suitable block copolymers include those sold by The Dow Chemical Company under the Tergitol™ trade name, and those sold by BASF under the Pluronics™ trade name.

Surfactants, if used, typically are present in amounts such as, for example, 0.25 to 2.5 parts by weight per 100 parts by weight of the mixture of polyols.

Another optional ingredient of the polyurethane-forming reaction mixture is a combustion modifier. The combustion modifier may be a solid or a liquid. The combustion modifier may include a non-halogenated flame retardant and/or a halogenated flame retardant. Exemplary combustion modifiers include melamine, phosphorous compounds with or without halogens such as tris(1-chloro-2-propyl)phosphate, aluminum containing compounds with or without halogens, nitrogen based compounds with or without halogens, chlorinated compounds, brominated compounds, expandable graphite, boron derivatives, and polyureas. Combustion modifiers, if present, may be present in an amount of at least 1 part, or at least 3 parts and up to 45 parts, up to 25 parts, up to 10 parts or up to 5 parts by weight per 100 parts weight of the mixture of polyols.

A composite of the invention includes 8 to 85% by weight, based on the weight of the composite, of a discontinuous phase that comprises at least one particulate filler and/or at least one fiber. Both filler particles and reinforcing fibers may be present.

The "filler" is different than the reinforcing fiber in that it has an aspect ratio of less than 3.0 and preferably less than 2.0. The filler is in the form of particles that preferably have a longest dimension of from 50 nm to 1 mm. The filler particles more preferably have a longest dimension of from 250 nm to 500 μm, as measured using laser diffraction methods. The filler particles are made of an inorganic or organic material that is thermally stable (i.e., does not undergo a change in physical state or engage in chemical reactions) at the processing temperatures encountered during the curing step. Examples of suitable fillers include calcium carbonate, talc, wollastonite, various clays, ground glass, carbon black, titanium dioxide, iron oxide, aluminum hydroxide, magnesium hydroxide and the like. Calcium carbonate is a preferred filler.

The particulate filler, when used, is conveniently blended with the mixture of polyols or at least one component thereof, prior to forming the composite. In such a case, a wetting agent may be present, as the presence of the wetting agent can significantly reduce viscosity of the blend. Suitable wetting agents include certain acidic polyester and ammonium salts of acidic copolymers, as sold by BykUSA (member of Altana Group) under the trade names BYK W985 and BYK W969. Wetting agents are generally useful in amounts ranging from about 0.25 to 3, preferably 0.5 to 2, weight percent of the particulate filler.

The reinforcing fibers have an aspect ratio of at least 3 and may have diameters in the range of from 0.5 to 100 μm, preferably from 2 to 50 μm. The reinforcing fibers are made of a material that does not melt or thermally degrade at a temperature of less than 200° C. and which is stiffer than the polyurethane polymer matrix. The diameter of a reinforcing fiber is taken as that of a circle of equivalent area. The fiber may be a roving made up of multiple primary fibers having such diameters. Suitable fibers include, for example, glass fibers, boron fibers, other ceramic fibers, carbon fibers, metal fibers, natural fibers such as cotton and wool fibers, and synthetic polymer fibers that have the needed thermal stability and melting temperature. Glass rovings and fibers are preferred on the basis of cost, availability and performance. The fibers in some embodiments have a length/diameter ratio of at least 20, preferably at least 100. The fibers may have lengths of 2 mm or longer or 5 mm or longer. Fibers that are randomly oriented in the composite preferably have lengths of from 5 to 150 mm or 5 to 50 mm.

Reinforcing fibers may be present in the presence of a pre-formed mat, the fibers of which may be, for example, woven, knitted, needle-punched or otherwise bonded together. Continuous long fibers are useful, as are continuous fiber strands as described in U.S. Pat. No. 6,656,405, randomly or even non-randomly oriented long (greater than 150 mm length) and short (less than 150 mm in length, such as 5 to 150 mm or 5 to 50 mm) fibers.

Composites of the invention include 8 to 85% of the discontinuous phase (i.e., the filler and reinforcing fibers combined), based on the weight of the composite. The filler particles by themselves may constitute, for example, 0 to 60%, 5 to 60% or 25 to 50% of the weight of the composite, and the reinforcing fibers in such embodiments may constitute by themselves, for example, 0 to 60%, 2 to 60%, 3 to 25%, 3 to 15% or 3 to 10% of the total weight of the composite, provided the total amount of discontinuous phase is 8 to 85% of the discontinuous phase, i.e., the filler and reinforcing fibers combined, based on the weight of the composite.

A composite of the invention is formed by combining the mixture of polyols with the polyisocyanate and optionally one or more optional ingredients such as are described herein to produce a polyurethane-forming reaction mixture, and curing the polyurethane-forming reaction mixture in the presence of the reinforcing fibers and/or filler particles. Filler particles may be incorporated into either the isocyanate or, preferably, the mixture of polyols. Reinforcing fibers may be incorporated into the isocyanate, into the mixture of polyols, or with the polyurethane-forming reaction mixture as it is being formed or afterwards, but before it is cured. The process is performed in a manner such that the polyurethane-forming reaction mixture fills at least some of the spaces between the individual fibers and/or particles. After curing, the reinforcing fibers and/or filler particles are embedded in the polyurethane polymer matrix.

Various methods can be used to make the composite. A preferred manufacturing method is a long fiber injection (LFI) method. In a long fiber injection method, short (up to 150 mm, preferably 2 to 150 mm, more preferably 5 to 150 mm and still more preferably 5 to 50 mm) fibers are wetted with a polyurethane-forming reaction mixture and the wetted fibers are dispensed into an open mold or onto a form. Filler particles may be incorporated into the reaction mixture as well, typically by combining them with one or both of the polyisocyanate and the mixture of polyols. The fibers and the polyurethane-forming reaction mixture are conveniently dispensed through a mixhead and dispensed together into the mold or onto the form, typically by spraying, pouring or injection. The fibers are sometimes supplied to the process in the form of a continuous roving. In that case, the roving is chopped into discrete lengths immediately before being wetted with the polyurethane-forming reaction mixture. In some processes, the fiber is brought into a chamber in close proximity with the mixing head where the mixture of polyols and the polyisocyanate are mixed to form the polyurethane-forming reaction mixture. The fibers and polyurethane-forming reaction mixture are then dispensed together from the mixhead into the mold or onto the form. In other cases, the fibers and polyurethane-forming reaction mixture are dispensed from the mixhead separately, but into each other, so the dispensed fibers become wetted as they travel towards the surface of the mold. Once the mold is filled, it is closed and the polyurethane-forming reaction mixture is cured in the mold to form the polyurethane composite. If a form is used rather than a mold, mechanical pressure is applied during the curing process. By "form", it is meant any open (non-enclosed) surface upon which the fibers and polyurethane-forming reaction mixture are dispensed; the form may be, for example, a stationary surface or a moving surface such as a conveyor belt.

A preferred type of mixhead for performing a long fiber injection process includes a high pressure impingement mixer, by which the mixture of polyols and the polyisocyanate are brought into contact, mixed rapidly and brought into contact with the fibers. The fibers can be supplied in the form of continuous rovings that are chopped into the desired lengths immediately before being introduced into the mixhead. The resulting wetted fibers are sprayed, poured or injected into the mold or onto a form. Mixheads of these types are commercially available. They include the "LFI" mixheads that are available from Krauss-Maffei or "Interwet" mixheads that are available from The Cannon Group (Milan, Italy)

Other suitable methods include, for example, structural reaction injection molding (SRIM) methods, which include the steps of (A) introducing reinforcing fibers, typically in the form of a preformed woven or non-woven mat, into the cavity of a mold, the (B) introducing the polyurethane-forming reaction mixture into the mold such that the polyurethane-forming reaction mixture penetrates between the reinforcing fibers and then (C) curing the polyurethane-forming reaction mixture in the presence of the reinforcing fibers in the mold. Filler particles can be present as well, preferably being incorporated into one or both of the polyisocyanate and the mixture of polyols before forming the polyurethane-forming reaction mixture.

Another suitable manufacturing method is a reinforced reaction injection molding (RRIM) process, in which short (typically up to 1 mm, preferably from about 0.1 to 0.5 mm) fibers or a flaked reinforcement are dispersed in a liquid polyurethane precursor (typically the mixture of polyols), which is passed through a mixhead where the precursor mixes with other reactants and then injected into a closed mold, where the reaction mixture cures to form a polyurethane polymer matrix in which the fibers are embedded.

In any of the foregoing processes, once the mold or form has been filled with the wetted fibers, mechanical pressure is applied (by closing the mold or otherwise) and the polyurethane-forming reaction mixture is cured in the presence of the fibers and/or filler particles. The mold or form together with the applied wetted fibers may be heated to an elevated temperature such as 40 to 100° C. to perform the cure. In such a case, it is common to preheat the mold or form to the curing temperature. However, an important advantage of this invention is that elevated temperature curing is not necessary to obtain dimensionally stable parts. Thus, in a preferred process of the invention, the curing temperature is no greater than 40° C., especially no greater than 35° C. or 32° C., and may be, for example, 15 to 32° C. or 15 to 28° C. The curing temperature is the temperature applied to the exterior of the mold or form during curing. The curing reaction mixture typically generates heat during the exothermic reaction, which can raise the temperature of the reaction mixture and also heat the mold. In a typical process, the mold or form during curing is maintained in an atmosphere that has a temperature of no greater than 40° C., especially no greater than 35° C. or 32° C., and may be, for example, 15 to 32° C. or 15 to 28° C., and no additional heating or cooling is applied to the mold or form, or to the curing reaction mixture.

The polyurethane-forming reaction mixture is cured long enough that the composite can be demolded or removed from the form without permanent deformation or damage. The curing step generally requires from 0.5 to 60 minutes, depending on factors such as the particular polyurethane-forming reaction mixture, the dimensions of the part, and the curing temperature. The applied mechanical pressure during the curing step is sufficient to prevent unwanted expansion of the mold contents.

The resulting composite may have any arbitrary geometry and dimensions. Specialized shapes and dimensions may be required for specific applications. However, the invention is especially suitable for making large items such as deck planking, automotive and other vehicular structural beams, I-beams for construction, manhole covers and road or pavement decking, wind turbine blades, among others. The composite portion of such items may have a longest dimension of at least 0.5 meters, at least 1 meter, or at least 2 meters and up to 10 meters, up to 7.5 meters or up to 5 meters,

A composite of the invention may have a thickness of at least 5 mm, at least 10 mm, at least 12 mm or more, at least 15 mm, at least 18 mm or at least 25.4 mm. In some embodiments the thickness is up to 100 mm, or up to about 50 mm.

A composite of the invention may if desired be produced with a textured skin such as, for example, a wood grain pattern or other arbitrary pattern.

The composite of the invention may constitute the entire item. However, the item may further include one or more additional layers, such as a coating layer on some or all of the exterior surfaces of the polyurethane composite. The coating may impart useful properties such as weather stability, a higher coefficient of friction (for skid or slip resistance) or may be present for aesthetic reasons. A non-skid or non-slip coating on at least one surface is often beneficial. Such a coating may be a polyurethane polymer layer. Some products may have, for example, an elastomeric polyurethane coating applied over the composite of the invention, and one or more colored coatings exterior to the elastomeric polyurethane.

Coating layers can be produced in various manners, such as by applying a powder coating, in-mold paint, thermoplastic film and/or gel coating composition to the surface of the mold or form by methods such as casting or spraying, then introducing the fiber reinforcement and the polyurethane-forming composition into the mold or form and curing the polyurethane-forming composition (and the coating material if necessary. A coating also can be applied after the curable composition of this invention is cured, using techniques such as high-pressure injection in-mold coating processes or via post-demold painting or coating methods.

The polyurethane or the polyurethane matrix of a composite of the invention preferably has a glass transition temperature of at least 80° C. and more preferably at least 130° C., as measured by dynamic mechanical analysis.

The following examples are provided to illustrate the invention but are not intended to limit the scope thereof. All parts and percentages are by weight unless otherwise indicated.

EXAMPLE 1 AND COMPARATIVE SAMPLES A-H

Polyurethane composites are made by reacting a formulated polyol blend with a polymeric MDI in a mold with a 1000×30×50 mm cavity. The mold temperature is 22-24° C. in all cases except for Comparative Sample B, in which the mold temperature is 54° C. Fibers are omitted in these experiments to simplify the formulation and minimize the possible effects of uneven fiber distribution when using laboratory equipment.

All ingredients except the polyisocyanate are combined to produce a formulated polyol blend. The TIPA, which is a room temperature solid, dissolves in Polyol A upon mixing. The mold cavity is lined with a polyethylene film. The formulated polyol blend and polyisocyanate are separately equilibrated to 22-24° C., then combined for 20 seconds on a high-speed mixer to produce a polyurethane-forming reaction mixture. About 740 grams of the reaction mixture are poured into the lined mold cavity. A second piece of polyethylene film is placed atop the reaction mixture in the mold cavity and the mold is closed. The reaction mixture is cured in the mold for 20 minutes while maintaining it at the aforementioned temperatures. The resulting composites are demolded and stored at approximately 22-24° C. for 24 hours. The molded parts have densities in the range of 400 to 650 kg/m³.

The reaction mixture in each case is prepared from ingredients as indicated in Table 1.

Polyol A is a propoxylated glycerin. It has a nominal hydroxyl functionality of 3 and a hydroxyl number of 274 mg KOH/g (205 equivalent weight).

The Propoxylated TMP is a propoxylate of trimethylolpropane. It has a nominal functionality of 3 and a hydroxyl number of 950 mg KOH/g (59 equivalent weight).

The surfactant is a silicone foam-stabilizing surfactant.

TIPA is a 99% triisopropanolamine product.

Catalyst A is a 33% by weight solution of triethylenediamine in dipropylene glycol.

Catalyst B is benzyldimethylamine.

TCPP is tris(1-chloro-2-propyl)phosphate.

The CaCO₃ is a calcium carbonate powder.

Polymeric MDI A has an isocyanate content of 31.45% by weight and an average isocyanate functionality of 2.7.

Polymeric MDI B has an isocyanate content of 30.2% by weight and an average isocyanate functionality of 2.85.

TABLE 1

| Ingredient | Comp. A* | Comp. B* | Comp. C* | Comp. D* | Comp. E* | Comp. F* | Comp. G* | Ex. 1 |
|---|---|---|---|---|---|---|---|---|
| | | | | Parts By Weight | | | | |
| Polyol A | 92.8 | 92.8 | 92.8 | 92.8 | 84.8 | 89.8 | 67.8 | 80.8 |
| Surfactant | 1.38 | 1.38 | 1.38 | 1.38 | 1.38 | 1.38 | 1.38 | 1.38 |
| TIPA | 0 | 0 | 0 | 0 | 0 | 0 | 0 | 12 |
| Glycerin | 0 | 0 | 0 | 0 | 0 | 3 | 0 | 0 |
| Ethylene Glycol | 0 | 0 | 0 | 0 | 8 | 0 | 0 | 0 |
| Propoxylated TMP | 0 | 0 | 0 | 0 | 0 | 0 | 15 | 0 |
| Tripropylene Glycol | 0 | 0 | 0 | 0 | 0 | 0 | 10 | 0 |
| TCPP | 4.6 | 4.6 | 4.6 | 4.6 | 4.6 | 4.6 | 4.6 | 4.6 |
| Water | 0.95 | 0.95 | 0.95 | 0.95 | 0.95 | 0.95 | 0.95 | 0.95 |
| CaCO₃ | 150 | 150 | 180 | 150 | 150 | 150 | 150 | 150 |
| Catalyst A | 1 | 1 | 1.33 | 1 | | 1 | 1 | 1 |
| Catalyst B | 0 | 0 | 0 | 0.5 | 0 | 0 | 0 | 0 |
| Polyisocyanate A (index) | 105 | 0 | 105 | 105 | 105 | 100 | 105 | 105 |
| Polyisocyanate B | 0 | 105 | 0 | 0 | 0 | 0 | 0 | 0 |

TABLE 1-continued

| | Parts By Weight | | | | | | | |
| Ingredient | Comp. A* | Comp. B* | Comp. C* | Comp. D* | Comp. E* | Comp. F* | Comp. G* | Ex. 1 |
|---|---|---|---|---|---|---|---|---|
| B (index) Average Hydroxyl Equivalent Weight, polyols[1] | 204 | 204 | 204 | 204 | 138 | 173 | 133 | 165 |
| Average functionality, polyols[1] | 3.0 | 3.0 | 3.0 | 3.0 | 2.52 | 3.0 | 3.05 | 3.0 |

*Comparative.
[1]The polyols are Polyol A, plus TIPA, glycerin, ethylene glycol, the propoxylated TMP and tripropylene glycol, as present in each particular case, not counting other ingredients.

Dimensional stability for each of Comparative Samples A-G and Example 1 is assessed as follows: The length of each part is measured after equilibrating it for 24 hours at 22-24° C. The part is then laid horizontally in an oven and heated to 80° C. for 72 hours. Its length is measured immediately upon removing it from the oven. The part is then cooled to 22-24° C. over about one hour, and its length is measured again. Results are as indicated in Table 2.

The glass transition temperature ($T_g$) and storage modulus (at 70° C.) are determined for each of Comparative Samples A-G and Example 1, with those results also included in Table 2. $T_g$ is determined by a dynamic mechanical analysis (three point bending test) and is taken as the peak of the tan delta curve.

TABLE 2

| | Comp. A* | Comp. B* | Comp. C* | Comp. D* | Comp. E* | Comp. F* | Comp. G* | Ex. 1 |
|---|---|---|---|---|---|---|---|---|
| Initial Length, mm | 1001 | 1001 | 1000 | 1000 | 1001 | 1001 | 1000 | 1000 |
| Length at 80° C., mm | 1014 | 1017 | 1016 | 1017 | 1012 | 1010 | 1009 | 1005 |
| Length after recooling, mm | 1010 | 1014 | 1013 | 1014 | 1009 | 1007 | 1005 | 1003 |
| $T_g$, ° C. | 89 | 96 | 81 | 87 | 97 | 78 | 100 | 107 |
| Storage Modulus, MPa | 114 | 69 | 170 | 104 | 80 | 36 | 99 | 209 |

Comparative Sample A represents a baseline case. This formulation exhibits excellent dimensional stability when molded at 54° C. When molded at 22-24° C., however, the product undergoes a significant length increase, and does not closely reassume its original length upon recooling. The difference in results between the moldings made at 54° C. and 22-24° C. curing temperatures suggests that dimensional stability is related to the extent of curing that takes place during the molding step.

Comparative Samples B-G represent various approaches to improving dimensional stability. In Comparative Sample B, a higher functionality polyisocyanate is used to try to promote greater crosslinking during the molding step. Results are worse than the baseline.

In Comparative Sample C, the amount of filler is increased by 20%, as higher filler levels often impart greater dimensional stability to composites. Again, results are worse than the baseline case.

An additional catalyst is included in Comparative Sample D, but results are worse than the baseline.

Comparative Samples E, F and G represent attempts to increase the exotherm of the system (by lowering average equivalent weight of the polyols and increasing the amount of polyisocyanate) thereby increasing the extent of in-mold curing. In Comparative Sample F, a mixture of tripropylene glycol and propoxylated TMP is used due to the high viscosity of the propoxylated TMP, the tripropylene glycol regulates viscosity and also increases exotherm due to its low equivalent weight relative to Polyol A. Comparative Sample E performs comparably to the baseline, whereas Comparative Samples F and G show only small improvements. Comparative Samples E and F also exhibit surface defects upon demold.

The results obtained with Comparative Samples B-G demonstrate that a variety of approaches intended to promote better in-mold curing at low mold temperatures all fail to significantly improve dimensional stability. Increasing crosslink density via the use of a higher functionality polyisocyanate is ineffective, as is decreasing equivalent weight via the addition of various low equivalent weight polyols and adding an additional amine catalyst.

Example 1 unexpected has significantly better dimensional stability than the baseline and all of the other comparative samples. Expansion upon the heat treatment is only about one-third that of the baseline case, and only half that of the best of the other comparative samples. The results after recooling are similarly improved. The product demolds well to produce a good quality surface.

The $T_g$ and storage modulus data show a pronounced increase in both values when triisopropanolamine is included in the formulation. The other attempts to improve in-mold curing have comparatively little if any beneficial effect (compare Comp. B-G with Comp. A), underscoring the unique benefits of TIPA in the formulation.

EXAMPLES 2-5

Example 1 is repeated, varying the amount triisopropanolamine and adjusting the amount of Polyol A on a weightfor-weight basis. The formulations are as set forth in Table 3. Example 1 is included for reference. The moldings are evaluated for dimensional stability as in the previous samples, with results as indicated in Table 3.

TABLE 3

| Ingredient | Parts By Weight | | | | |
| | Ex. 2 | Ex. 3 | Ex. 1 | Ex. 4 | Ex. 5 |
|---|---|---|---|---|---|
| Polyol A | 87.8 | 82.8 | 80.8 | 77.8 | 72.8 |
| TIPA | 5 | 10 | 12 | 15 | 20 |
| Surfactant | | | 1.38 | | |
| TCPP | | | 4.6 | | |
| Water | | | 0.95 | | |
| CaCO$_3$ | | | 150 | | |
| Catalyst A | | | 1 | | |
| Polyisocyanate A (index) | 105 | 105 | 105 | 105 | 105 |
| Initial Length, mm | 1000 | 1000 | 1000 | 1000 | 1000 |
| Length at 80° C., mm | 1007 | 1006 | 1005 | 1004 | 1002 |
| Length after recooling, mm | 1005 | 1004 | 1003 | 1002 | 1000 |

The results indicated in Table 3 show that triisopropanolamine improves dimensional stability when used over a wide range of loadings. Within this range, dimensional stability improves with increased triisopropanolamine loading.

COMPARATIVE SAMPLES H-K

Triethanolamine is commonly used as a crosslinker in polyurethane foam formulations. It is chemically similar to triisopropanolamine in that both contain a single tertiary nitrogen atom and both have three hydroxyl groups. Polyurethane composite Comparative Samples H-K are made formulations corresponding to those of Examples 2-5, except triethanolamine (TEOA) replaces triisopropanolamine on a weight-for-weight basis.

Comparative Samples A and H-K and Examples 2-5 each are evaluated for cream, gel and tack-free time, in each case by forming a formulated polyol blend of all ingredients except the polyisocyanate, and equilibrating the polyol blend to 40° C. The polyisocyanate is separately equilibrated to 25° C. The polyisocyanate and polyol blend are combined for 12 seconds on a high-speed laboratory mixer and poured into cups. Cream time is the time after pouring at which a visible reaction is observed. A metal stick is periodically pressed to the surface of the curing reaction mixture and removed to evaluate for gel time (the time after mixing at which strings of polymer stick to the spatula). A human finger is periodically pressed to the surface of the curing reaction mixture and removed to evaluate tack-free time (the time after mixing at which the polymer no longer sticks to the finger). Those results are indicated in Table 4.

As the data in Table 4 indicates that adding these amounts of TIPA causes only a small decrease in cream, gel and tack-free times across the entire range of loadings. TEOA, on the other hand, causes very large deceases in each of those times, indicating a very large increase in the reactivity of the system. Because of their lower reactivity, the TIPA-containing systems are better adapted than the TEOA-containing systems for making large moldings in a casting process. The small increase in reactivity of the TIPA systems allows them to be used easily in such processes.

The invention claimed is:

1. A composite comprising a continuous resin phase and 8 to 85% by weight, based on the weight of the composite, of a discontinuous phase comprising filler particles, reinforcing fibers or both filler particles and reinforcing fibers, wherein the continuous resin phase is a cured polyurethane which is the reaction product of a polyurethane-forming reaction mixture characterized by an isocyanate index of 95 to 150, the reaction mixture comprising A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 275 and an average hydroxyl functionality of 2.5 to 4 hydroxyl groups per molecule, wherein triisopropanolamine constitutes 12 to 33 weight percent of the mixture of polyols, wherein the reinforcing fibers are selected from one or more of a group consisting of glass fibers, boron fibers, ceramic fibers, carbon fibers, and metal fibers, and wherein the cured polyurethane has a glass transition temperature of at least 80° C.

2. The composite of claim 1 wherein the discontinuous phase comprises reinforcing fibers having diameters of 0.5 to 10 μm and lengths of 2 mm to 150 mm.

3. The composite of claim 1 wherein the fibers are glass fibers.

4. The composite of claim 3 wherein the discontinuous phase further comprises filler particles.

5. The composite of claims 1 which contains 2 to 15% by weight reinforcing fibers, 30 to 70% by weight of filler particles and 20 to 50% by weight of the continuous resin phase.

6. The composite of claim 1 which has a void volume of no greater than 65%.

7. A process for preparing a composite of claim 1, comprising (i) introducing reinforcing fibers and/or filler particles and a polyurethane-forming reaction mixture into a cavity of a mold or onto a form, closing the mold or applying mechanical pressure to the form such that the reinforcing

TABLE 4

| | Comp. A* | Ex. 2 | Comp. H* | Ex. 3 | Comp. J* | Ex. 4 | Comp. J* | Ex. 5 | Comp. K* |
|---|---|---|---|---|---|---|---|---|---|
| Polyol A | 92.8 | 87.8 | 87.8 | 82.8 | 82.8 | 77.8 | 77.8 | 72.8 | 72.8 |
| TIPA | 0 | 5 | 0 | 10 | 0 | 15 | 0 | 20 | 0 |
| TEOA | 0 | 0 | 5 | 0 | 10 | 0 | 15 | 0 | 20 |
| Cream Time, s | 32 | 29 | 25 | 28 | 20 | 27 | 19 | 26 | 19 |
| Gel Time, s | 125 | 115 | 83 | 110 | 60 | 100 | 49 | 104 | 40 |
| Tack-free time, s | 185 | 170 | 124 | 161 | 85 | 150 | 64 | 140 | 51 |

*Comparative fibers and/or filler particles become embedded in the polyurethane-forming reaction mixture and (ii) curing the polyurethane-forming reaction mixture in the presence of the reinforcing fibers and/or filler particles in the mold cavity or on the form to form the composite, wherein the polyurethane-forming reaction mixture is characterized by an isocyanate index of 95 to 150 and comprises A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 275 and an average hydroxyl functionality of 2.5 to 4 hydroxyl groups per molecule, wherein triisopropanolamine constitutes 12 to 33 weight percent of the mixture of polyols, wherein the reinforcing fibers are selected from one or more of a group consisting of glass fibers, boron fibers, other ceramic fibers, carbon fibers, and metal fibers, and wherein the cured polyurethane has a glass transition temperature of at least 80° C.

8. The process of claim 7 wherein the step of curing the polyurethane-forming reaction mixture is performed at a temperature of no greater than 40° C.

9. The process of claim 7 wherein the composite has a void volume of no greater than 65%.

10. The process of any of claim 7 wherein the polyurethane-forming reaction mixture contains reinforcing fibers having diameters of 0.5 to 10 μm and lengths of 2 mm to 150 mm.

11. The process of any of claim 7 wherein the composite contains 2 to 15% by weight reinforcing fibers, 30 to 70% by weight of filler particles and 20 to 50% by weight of the continuous resin phase.

12. The process of any of claim 7, wherein step (i) is performed by wetting the reinforcing fibers with the polyurethane-forming reaction mixture, dispensing the reinforcing fibers wetted with the polyurethane-forming reaction mixture into the mold or onto a form, closing the mold or applying mechanical pressure to the polyurethane-forming reaction mixture on the form and curing the polyurethane-forming reaction mixture in the mold.

* * * * *